US010393007B2

(12) United States Patent
Kraemer et al.

(10) Patent No.: US 10,393,007 B2
(45) Date of Patent: Aug. 27, 2019

(54) SPARK-IGNITED INTERNAL COMBUSTION ENGINE WITH ELECTRICALLY DRIVABLE EXHAUST GAS TURBOCHARGER, AND METHOD FOR OPERATING AN INTERNAL COMBUSTION ENGINE OF THIS TYPE

(71) Applicant: Ford Global Technologies, LLC, Dearborn, MI (US)

(72) Inventors: Frank Kraemer, Neunkirchen-Seelscheid (DE); Vanco Smiljanovski, Bedburg (DE); Joerg Kemmerling, Monschau (DE); Helmut Matthias Kindl, Aachen (DE); Franz J. Brinkmann, Huerth-Efferen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

(21) Appl. No.: 15/151,297

(22) Filed: May 10, 2016

(65) Prior Publication Data

US 2016/0333775 A1 Nov. 17, 2016

(30) Foreign Application Priority Data

May 15, 2015 (DE) ........................ 10 2015 208 990

(51) Int. Cl.
*F02B 33/44* (2006.01)
*F02B 37/10* (2006.01)
(Continued)

(52) U.S. Cl.
CPC .............. *F02B 37/10* (2013.01); *F02B 37/24* (2013.01); *F02B 39/10* (2013.01); *Y02T 10/144* (2013.01)

(58) Field of Classification Search
CPC ........ F02B 37/24; F02B 37/225; F02B 37/10; F02B 37/001; F02B 37/004; F02B 37/007; F02B 37/013; F02B 39/10
(Continued)

(56) References Cited

U.S. PATENT DOCUMENTS 2,620,621 A * 12/1952 Nettel ..................... F02B 37/04
60/39.15
4,656,975 A 4/1987 Johnson
(Continued)

FOREIGN PATENT DOCUMENTS

DE 4102414 A1 * 7/1992 ............ F02B 37/005
DE 10050161 A1 4/2002
(Continued)

OTHER PUBLICATIONS

WO2015185407A1 Turbocharger Having an Electric Machine—Machine Translation.*

*Primary Examiner* — Ngoc T Nguyen
(74) *Attorney, Agent, or Firm* — Julia Voutyras; McCoy Russell LLP

(57) ABSTRACT

The disclosure relates to a spark-ignited charged internal combustion engine coupled to an exhaust gas turbocharger with a compressor mounted on a rotatable shaft, the rotatable shaft coupled to a turbine and to an electric auxiliary drive. The electric auxiliary drive of the exhaust gas turbocharger may be activated to increase rotational speed of the rotatable shaft to drive the compressor to supply boost to the engine. The electric auxiliary drive may be engaged or disengaged from the rotatable shaft, responsive to engine operating conditions, such as engine speed, rotation speed of the rotatable shaft, exhaust volume, and engine boost demand.

20 Claims, 4 Drawing Sheets

(51) Int. Cl.
*F02B 37/24* (2006.01)
*F02B 39/10* (2006.01)

(58) Field of Classification Search
USPC .......................... 60/612, 602, 611; 123/562
See application file for complete search history.

(56) References Cited

U.S. PATENT DOCUMENTS

| | | | |
|---|---|---|---|
| 5,025,629 | A | 6/1991 | Woollenweber |
| 5,771,695 | A | 6/1998 | Halimi |
| 7,540,149 | B2 | 6/2009 | Sumser et al. |
| 2002/0041813 | A1 | 4/2002 | Fledersbacher et al. |
| 2014/0208745 | A1* | 7/2014 | Suhocki ................. F02B 37/04 60/611 |
| 2016/0024997 | A1* | 1/2016 | Buschur ................. F02B 37/10 60/607 |

FOREIGN PATENT DOCUMENTS

| | | | |
|---|---|---|---|
| DE | 602004000194 T2 | 8/2006 | |
| EP | 2072824 A2 * | 6/2009 | ......... F04D 25/0606 |
| KR | 20060010221 A * | 2/2006 | |
| WO | 2009000804 A2 | 12/2008 | |
| WO | WO 2013004595 A1 * | 1/2013 | .............. B60K 6/24 |
| WO | 2015185407 A1 | 12/2015 | |

\* cited by examiner

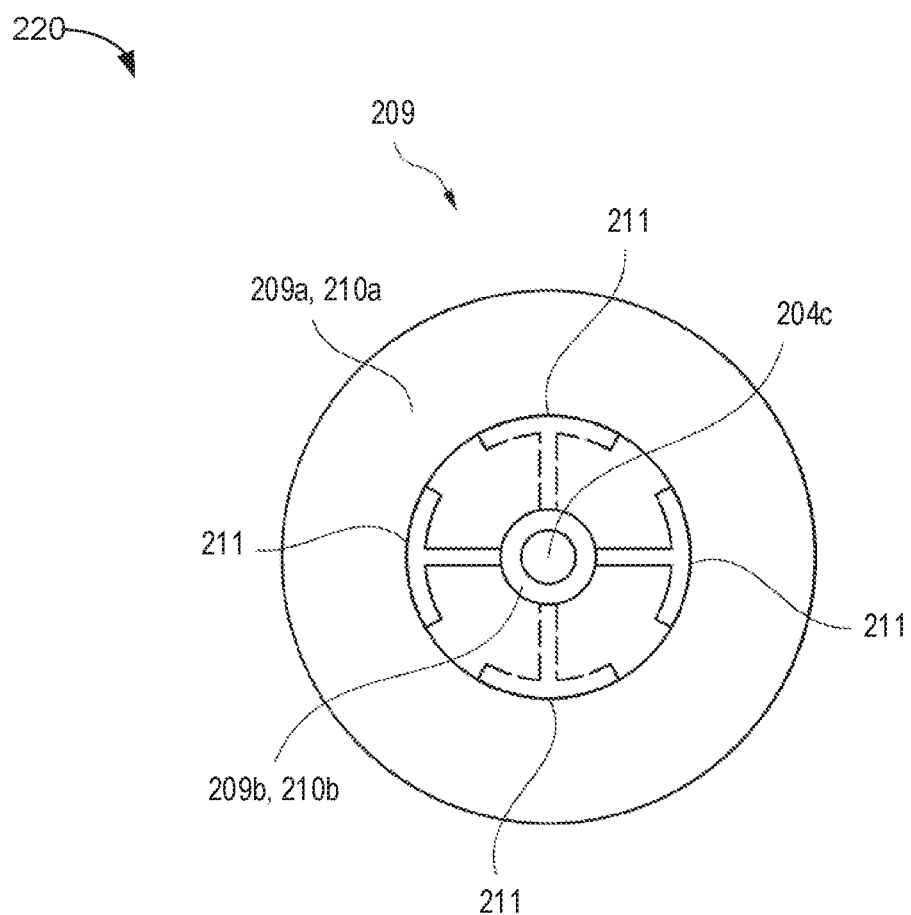

SPARK-IGNITED INTERNAL COMBUSTION ENGINE WITH ELECTRICALLY DRIVABLE EXHAUST GAS TURBOCHARGER, AND METHOD FOR OPERATING AN INTERNAL COMBUSTION ENGINE OF THIS TYPE

CROSS REFERENCE TO RELATED APPLICATION

This application claims priority to German Patent Application No. 102015208990.8, filed May 15, 2015, the entire contents of which are hereby incorporated by reference for all purposes.

FIELD

The present description relates generally to methods and systems for controlling a vehicle engine.

BACKGROUND/SUMMARY

Charging is a suitable means for increasing the power of an internal combustion engine with unchanged engine displacement or for reducing the engine displacement with constant power. Charging leads to an increase of the power/volume ratio and to a more favorable performance measure. The air for the combustion process is compressed, whereby a greater air mass may be fed to each cylinder per working cycle. The fuel mass and therefore the mean pressure may thus be increased.

If the engine displacement is reduced, the load configuration may shift toward higher loads, at which the specific fuel consumption is lower. By charging in combination with a suitable transmission, what is known as a downspeeding may also be provided, with which lower specific fuel consumption likewise may be obtained.

The charging consequently assists the ongoing effort in the development of internal combustion engines to minimize the fuel consumption, so as to enhance the efficacy of the internal combustion engine.

In one example, at least one exhaust gas turbocharger may be used for the charging, in which a compressor and a turbine are arranged on the same shaft. The hot exhaust gas flow is fed to the turbine and expands with energy release in the turbine, whereby the shaft is set in rotation. The energy delivered from the exhaust gas flow to the turbine and ultimately to the shaft is used for the drive of the compressor, which likewise is arranged on the shaft. The compressor conveys and compresses the charge air fed thereto, whereby a charging of the cylinders is achieved. A charge air cooler is advantageously provided downstream of the compressor in the intake system and is used to cool the compressed charge air prior to entry into the at least one cylinder. The cooler lowers the temperature and thus increases the density of the charge air, such that the cooler also contributes to an enhanced filling of the cylinders with a greater air mass. Compression is achieved by cooling.

In the exhaust gas turbocharger, unlike a mechanical supercharger, no mechanical connection for the power transfer between supercharger and internal combustion engine is needed. The mechanical supercharger draws the energy for drive thereof from the internal combustion engine and thus reduces the provided power and in this way diminishes the efficacy, while the exhaust gas turbocharger utilizes the exhaust gas energy of the hot exhaust gases.

The mechanical supercharger, unlike the exhaust gas turbocharger, generally may generate and provide the charge air pressure independently of the momentary operating state of the internal combustion engine, in particular even at low speeds of rotation of the crankshaft. This is true in particular for a mechanical supercharger which may be driven by means of electric machine.

In the case of exhaust gas turbocharging, difficulties are often encountered, specifically in providing a sufficiently high charge air pressure at low rotational speeds as well. When a certain rotational speed is undershot, a torque reduction is observed. This torque reduction is understandable as the charge air pressure ratio is dependent on the turbine pressure ratio. In one example, reduction of the rotational speed leads to a smaller exhaust gas mass flow and therefore to a smaller turbine pressure ratio. As a result, the charge air pressure ratio likewise decreases toward excessively low rotational speeds, which is equivalent to a torque reduction.

Previous attempts to enhance the torque characteristic of a charged internal combustion engine include a small turbine cross section with exhaust gas blow off. A turbine of this type is also referred to as a wastegate turbine. If the exhaust gas volume exceeds a threshold value, some of the exhaust gas flow is guided past the turbine via a bypass line within the scope of what is known as exhaust gas blow off. However, the charging described above may be insufficient at higher rotational speeds or with greater exhaust gas volumes. In addition, the blown-off exhaust gas may be guided past the turbine without further use, without utilization of the energy available in the hot exhaust gas.

The torque characteristic of a charged internal combustion engine may also be enhanced by means of a plurality of turbochargers arranged in parallel, for example, by means of a plurality of turbines of smaller turbine cross section arranged in parallel, the turbines being connected successively with increasing exhaust gas volume.

The torque characteristic may also be influenced by means of a plurality of exhaust gas turbochargers connected in series. As a result of the connection series of two exhaust gas turbochargers, of which one exhaust gas turbocharger serves as high-pressure stage and one exhaust gas turbocharger serves as a low-pressure stage, the compressor map may be extended, both to smaller compressor flows and to larger compressor flows.

In the case of the exhaust gas turbocharger serving as high-pressure stage, a shift of the pump capacity to smaller compressor flows is possible in particular, whereby high charge air pressure conditions may be obtained even with small compressor flows, which significantly enhances the torque characteristic in the lower rotational speed range. This may be achieved by use of the high-pressure turbine for small exhaust gas mass flows and provision of a bypass line, with which exhaust gas may be increasingly guided past the high-pressure turbine with increasing exhaust gas mass flow. The bypass line for this purpose branches off upstream of the high-pressure turbine from the exhaust gas discharge system and leads back into the exhaust gas discharge system upstream of the low-pressure turbine. A shutoff element may be positioned in the bypass line in order to control the exhaust gas flow guided past the high-pressure turbine.

The patent application DE 10050161 A1 describes an internal combustion engine in which the exhaust gas turbocharging is provided with an electric auxiliary drive including a stator and a rotor. The auxiliary drive may be activated by shifting of the rotor, where the rotor is coupled to the compressor impeller for conjoint rotation therewith as a result of the shifting. Alternatively, the rotor may be independent of the actual compressor impeller and may be connected to an upstream precursor wheel for conjoint rotation therewith. The rotor does not drive the exhaust gas turbocharger as such, but rather the precursor wheel, which contributes to the conveyance of charge air at low rotational speeds. In the first case a complex shift mechanism and a clutch or coupling may be provided.

The inventors herein provide a spark-ignited charged internal combustion engine, which is simplified and therefore enhanced in respect of the activation of the electric auxiliary drive of the exhaust gas turbocharging. The inventors also provide a method for operating the spark-ignited internal combustion engine.

In one example, a spark-ignited charged internal combustion engine may include at least one cylinder, an intake system for feeding charge air to the at least one cylinder, an exhaust gas discharge system for discharging exhaust gas from the at least one cylinder, and at least one exhaust gas turbocharger, which comprises a housing, a turbine which is arranged in the exhaust gas discharge system and which has at least one turbine impeller mounted on a rotatable shaft, and a compressor which is arranged in the intake system and which has at least one compressor impeller mounted on the rotatable shaft. The turbocharger may further include an electric auxiliary drive, which comprises a stator and a rotor, the rotor of the electric auxiliary drive comprising a wheel arranged and mounted on the shaft of the exhaust gas turbocharger, said wheel being a wheel running freely in one direction of rotation, which runs freely when the rotational speed $n_{shaft}$ of the shaft of the exhaust gas turbocharger is greater than the rotational speed $n_{wheel}$ of the wheel.

The rotor of the electric auxiliary drive may be mounted on the shaft of the exhaust gas turbocharger via an overrunning clutch, such that the rotor runs freely in one direction of rotation and in the other direction of rotation is connected to the shaft of the exhaust gas turbocharger in a frictionally engaged manner. The rotor may turn freely when the rotational speed $n_{shaft}$ of the shaft of the exhaust gas turbocharger is greater than the rotational speed $n_{wheel}$ of the rotor.

The shaft of the exhaust gas turbocharger may be driven by the turbine of the exhaust gas turbocharger, specifically when enough exhaust gas flows through the turbine and the turbine may perform the compressor work. Then, the rotational speed $n_{shaft}$ of the shaft of the exhaust gas turbocharger may be greater than the rotational speed $n_{wheel}$ of the rotor and the rotor turns freely. The shaft may revolve freely under the rotor. Any braking torques or detent torques of the deactivated auxiliary drive may be harmless and may be without influence. Thus, the exhaust gas turbocharger may be operated with omission of the electric auxiliary drive.

Otherwise, the shaft of the exhaust gas turbocharger is driven by the rotor of the electric auxiliary drive specifically when insufficient exhaust gas flows through the turbine and the turbine may no longer perform the compressor work. This is generally anticipated at low rotational speeds or with small exhaust gas volumes. The rotor is then connected to the shaft of the exhaust gas turbocharger in a frictionally engaged manner, entrains the shaft and allows this to turn at the rotational speed $n_{shaft}=n_{wheel}$. The electric auxiliary drive in the present case takes over the drive of the exhaust gas turbocharger. This may occur at low rotational speeds or with small exhaust gas volumes.

The above described spark-ignited charged internal combustion engine provides a simplified and efficient system for the activation of the electric auxiliary drive for delivering boost to the engine, especially when exhaust volume (for example, at low engine speeds) is not adequate to provide enough rotational speed through the turbine to the shaft for driving the compressor. The electric auxiliary drive may engage the shaft to increase compression and delivery of more air to the engine through the compressor, thereby providing boost even at low engine speeds, and ensuring a wider operational range of the compressor for delivering adequate charge air to the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A and 2B show sectional views of a turbocharger coupled to an internal combustion engine.

DETAILED DESCRIPTION

Figure 1:
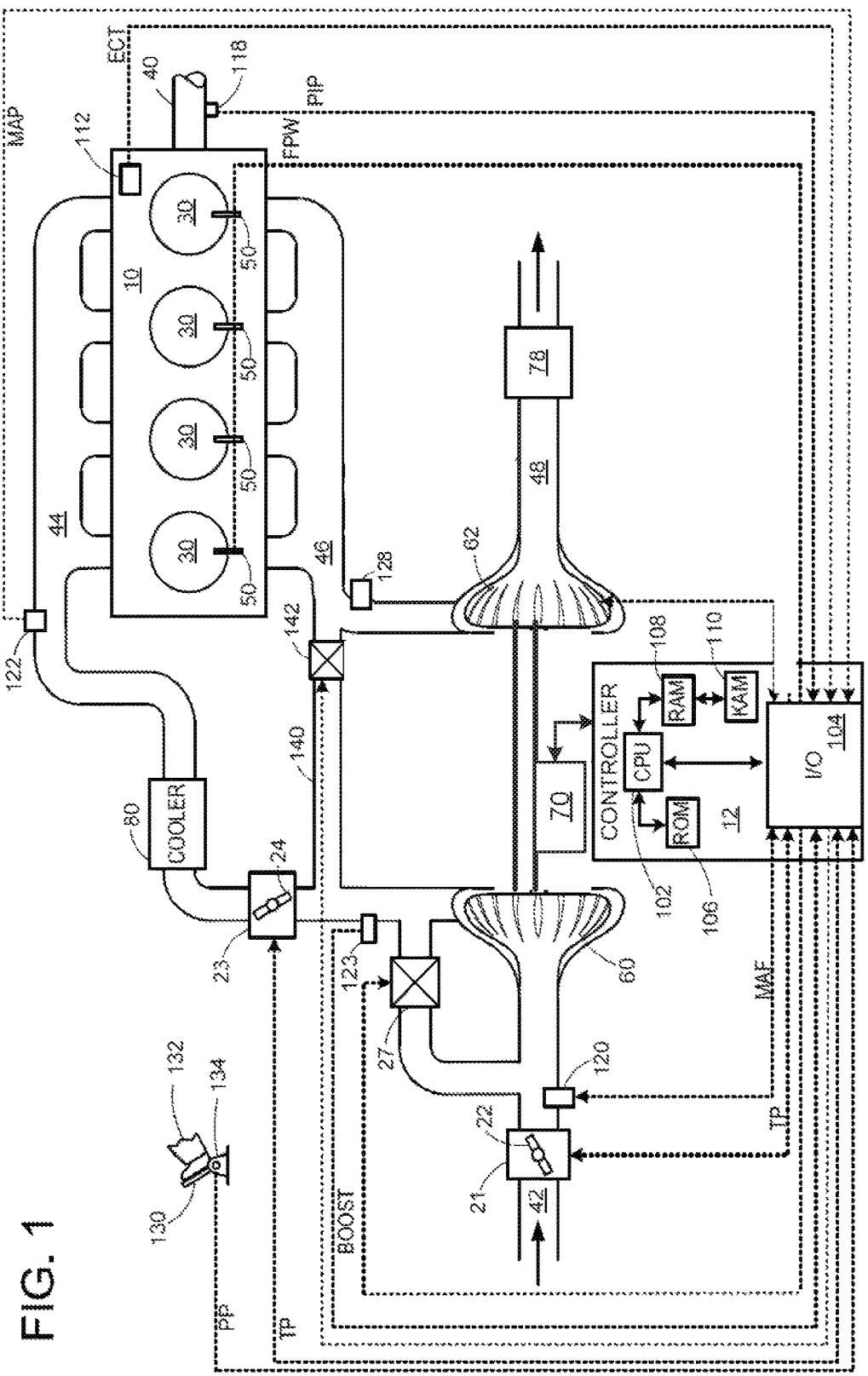
FIG. 1 shows an embodiment of an internal combustion engine.

The description relates to a spark-ignited charged internal combustion engine. The internal combustion engine may be used as a motor vehicle drive. The term internal combustion engine may include spark-ignited gasoline engines, but also spark-ignited hybrid internal combustion engines, which may use a hybrid combustion method with externally supplied ignition, and also hybrid drives, which besides the spark-ignited internal combustion engine also comprise an electric machine that may be connected in terms of drive to the internal combustion engine, in which electric machine takes power from the spark-ignited internal combustion engine or additionally releases power as a connectable auxiliary drive. The internal combustion engine described herein may also apply to compression-ignition engines.

The spark-ignited charged internal combustion engine may include at least one cylinder, an intake system for feeding charge air to the at least one cylinder, an exhaust gas discharge system for discharging exhaust gas from the at least one cylinder, and at least one exhaust gas turbocharger, which comprises a housing, a turbine which is arranged in the exhaust gas discharge system and which has at least one turbine impeller mounted on a rotatable shaft, and a compressor which is arranged in the intake system and which has at least one compressor impeller mounted on the rotatable shaft, there being provided an electric auxiliary drive, which comprises a stator and a rotor.

In one embodiment of the spark-ignited charged internal combustion engine, one exhaust gas turbocharger may be provided, including a turbine arranged in the exhaust gas discharge system and a compressor arranged in the intake system. The positioning of the turbine of the one exhaust gas turbocharger close to the engine may be possible without difficulty, and therefore the exhaust gas enthalpy of the hot exhaust gases, which is determined definitively by the exhaust gas pressure and the exhaust gas temperature, may be optimally utilized and a rapid response behavior of the turbocharger may be ensured. The path of the hot exhaust gases to the turbine may be shortened by an arrangement close to the engine, and the volume of the exhaust gas discharge system upstream of the turbine may also decrease.

The thermal inertia of the exhaust gas discharge system likewise decreases, more specifically by reducing the mass and the length of the portion of the exhaust gas discharge system up to the turbine.

The use of an individual exhaust gas turbocharger instead of a plurality of turbochargers may be useful with respect to the frictional power and the overall efficacy of the internal combustion engine. In addition, there may be no switchover between a plurality of exhaust gas turbochargers. This may also prove to be useful with respect to the torque characteristic and in particular, may prevent a temporary torque interruption. The arrangement of the turbine of the sole exhaust gas turbocharger close to the engine may result in a dense packaging of the overall drive unit.

Since the disclosure concerns an exhaust gas turbocharger which is provided with an electric auxiliary drive which may take on the drive of the exhaust gas turbocharger at low rotational speeds or with small exhaust gas volumes, it may be possible to have the exhaust gas turbocharger or the associated turbine equipped for large exhaust gas volumes or for the maximum anticipated exhaust gas volumes. A bypass line on the turbine side may then be dispensed with where appropriate, and a satisfactory torque characteristic and an enhanced charging behavior may be ensured both at low rotational speeds or with small exhaust gas volumes and at higher rotational speeds or with larger exhaust gas volumes.

The use of a plurality of exhaust gas turbochargers, for example a two-stage charging, with the arrangement of all turbines close to the engine may result in greater problems in principle. Nevertheless, in embodiments of the spark-ignited charged internal combustion engine in which the at least two exhaust gas turbochargers are provided, each exhaust gas turbocharger may include a turbine arranged in the exhaust gas discharge system and a compressor arranged in the intake system.

Embodiments of the spark-ignited charged internal combustion engine may include the turbine of the exhaust gas turbocharger not having a bypass line. Then, exhaust gas may no longer be guided unused, past the turbine, within the scope of the exhaust gas blow off. The overall efficacy of the internal combustion engine may be enhanced as a result. The absent bypass line may additionally ensure a dense packaging of the drive unit.

Embodiments of the spark-ignited charged internal combustion engine may include the turbine of the at least one exhaust gas turbocharger including a variable turbine geometry. The variable turbine geometry may ensure an extensive adaptation to the respective operating point by adjusting the turbine geometry or the effective turbine cross section. Here, guide vanes for influencing the flow direction may be arranged upstream of the at least one impeller of the turbine. In contrast to the impeller blades of the turning impeller, the guide vanes do not rotate with the shaft of the turbine. The guide vanes may be arranged in a stationary manner, but may not be completely immobile, and instead may be rotatable about their axis, such that the incident flow onto the impeller blades may be influenced. In contrast, if the turbine has a fixed invariable geometry, the guide vanes may be stationary, and completely immobile (rigidly fixed).

Embodiments of the spark-ignited charged internal combustion engine may include the compressor of the at least one exhaust gas turbocharger including a variable compressor geometry. In particular, when a small exhaust gas volume is conveyed through the turbine, a variable compressor geometry may be useful, since the pump capacity of the compressor may be shifted to small compressor flow by adjusting the guide vanes in the compressor map, and a working of the compressor beyond the pump capacity may thus be avoided. The variable compressor geometry therefore may also offer advantages when the electric auxiliary drive takes on the drive of the exhaust gas turbocharger at low rotational speeds or with small exhaust gas volumes. In one example, if the turbine of the at least one exhaust gas turbocharger has a variable turbine geometry, the variable compressor geometry may be continuously matched to the turbine geometry.

In one embodiment of the spark-ignited charged internal combustion engine, a battery may be provided for storing electrical energy. The electrical energy may be stored in order to supply and to drive the electric auxiliary drive.

In an embodiment of the spark-ignited charged internal combustion engine, the compressor of the at least one exhaust gas turbocharger may be a radial compressor, the radial compressor having an entry region that extends and may be formed coaxially with the shaft of the exhaust gas turbocharger. In the radial compressor, the flow-off from the impeller blades may be substantially radial. The term substantially radial within the scope of the present disclosure means that the velocity component in the radial direction is greater than the axial velocity component.

The entry region extending and formed coaxially with the shaft of the exhaust gas turbocharger may ensure a substantially axial incident flow onto the blades of the compressor. The term substantially axial within the scope of the present disclosure means that the velocity component in the axial direction is greater than the radial velocity component.

In an embodiment of the spark-ignited charged internal combustion engine, the electric auxiliary drive may be arranged in the entry region of the radial compressor. The auxiliary drive may then be arranged on the compressor side and therefore at a distance from the turbine, which may be exposed to exhaust gas, whereby a certain level of protection against thermal overload is provided. Where appropriate, the accordingly formed wheel of the rotor may then convey the charge air in the direction of the radial compressor, similarly to an axial compressor or an axial fan.

The charge air, after passing through the wheel, may not have to be deflected in order to be fed to the radial compressor. Unnecessary pressure losses in the charge air flow as a result of flow deflection may be avoided, and the charge air, which is preliminarily compressed where appropriate, may be further compressed in the radial compressor. The efficacy and the charge air ratio of the compression may be thus increased.

In one example of the spark-ignited charged internal combustion engine, the turbine of the at least one exhaust gas turbocharger may be a radial turbine, ensuring a dense packaging of the exhaust gas turbocharger and therefore of the charging as a whole. In the case of a radial turbine the impeller blades may be subject to a substantially radial incident flow.

In one embodiment of the spark-ignited charged internal combustion engine, the stator may be arranged at least also in the housing and may be mounted in a manner fixed to the housing. The housing of the at least one exhaust gas turbocharger may be constructed in a modular manner, for example, may be formed in a number of parts, and besides the bearing housing and the turbine housing may also include the compressor housing.

The electric auxiliary drive may be an electric motor including a stator and a rotor. The electric motor may thus be formed having a rotatable rotor and a stator fixed to the housing in which the stator circumferentially surrounds the wheel-shaped rotor, which is preferably fabricated from a magnetic material. When the stator, preferably a coil, is energized, an electromagnetic force rotating the rotor is generated.

In this context, embodiments of the stator may include an energizable coil for establishing a magnetic field. For the reasons mentioned above, embodiments of the spark-ignited charged internal combustion engine may include the rotor having at least one permanent magnet for establishing a magnetic field. Here, embodiments of the spark-ignited charged internal combustion engine may include the at least one permanent magnet arranged on a radially outer edge of the wheel of the rotor and therefore in the vicinity of the stator or the energizable coil. Embodiments of the spark-ignited charged internal combustion engine may also include the rotor with an energizable coil for establishing a magnetic field.

In contrast to the previous embodiment, the rotor may include at least one permanent magnet, and an energizable coil for establishing a magnetic field. The energizable coil may be supplied with a clocked current feed for rotating the coil of the rotor, which may include a current reversal and therefore brushes. This type of electric motor is more complex and may have a higher spatial requirement, and may be rather unsuitable for the present disclosure, in which there may be little installation space, but may be still possible in principle.

In one embodiment of the spark-ignited charged internal combustion engine, the stator includes at least one permanent magnet for establishing a magnetic field and the rotor may include an energizable coil for establishing the magnetic field.

In one example of the spark-ignited charged internal combustion engine, the wheel of the rotor may be arranged and mounted on the shaft of the exhaust gas turbocharger as a spoked wheel. The wheel may provide a low resistance to the charge air flow.

An example method for operating a spark-ignited charged internal combustion engine of a type described above may include the electric auxiliary drive being activated in order to set the shaft in rotation and to drive the compressor.

In one example of the method, the electric auxiliary drive may be activated when the rotational speed $n_{shaft}$ of the shaft of the exhaust gas turbocharger falls below a predefinable rotational speed $n_{down,1}$. The rotational speed $n_{shaft}$ of the supercharger shaft may be measured, for example, by means of a sensor. A low rotational speed $n_{shaft}$ of the exhaust gas turbocharger may be used as an indication that the turbine may no longer perform the compressor work and the electric auxiliary drive may be engaged in order to drive the compressor.

In another example of the method, the electric auxiliary drive may be activated when the rotational speed $n_{mot}$ of the internal combustion engine falls below a predefinable rotational speed $n_{down,2}$. A low rotational speed generally induces a low exhaust gas volume, which in turn may lead to a small turbine pressure ratio. This may cause the charge pressure ratio likewise to drop toward lower rotational speeds, which may be equivalent to a torque loss.

In an example of the method, the electric auxiliary drive may be activated when the exhaust gas volume of the internal combustion engine falls below a predefinable exhaust gas volume. The exhaust gas volume may fall below the predefinable exhaust gas volume in conjunction with the engine speed decreasing.

To summarize, a determination may be made with respect of the charging of internal combustion engines that an enhancement of the torque characteristic is of significance, in particular at low rotational speeds or with small exhaust gas volumes, wherein the use exclusively of electrically driven superchargers may not be expedient, since the electrical power or energy for this purpose may not be available onboard a motor vehicle. In conjunction with the charging of an internal combustion engine of a motor vehicle, an electric drive may be an electric auxiliary drive, which may be activated and operated for assistance as requested. The exhaust gas turbocharging of the internal combustion engine may be also provided with an electric auxiliary drive comprising a stator and a rotor.

Figure 2A:
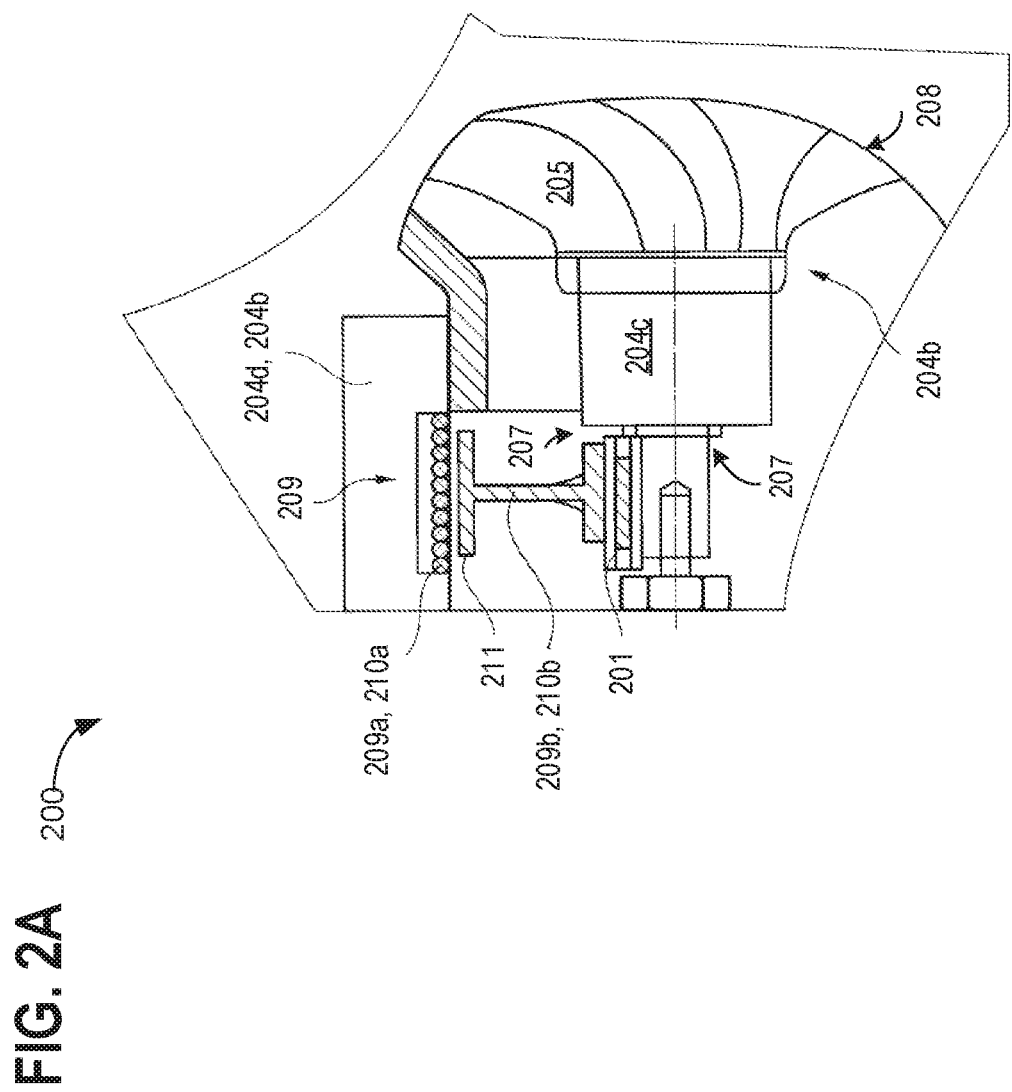
Figure 3:
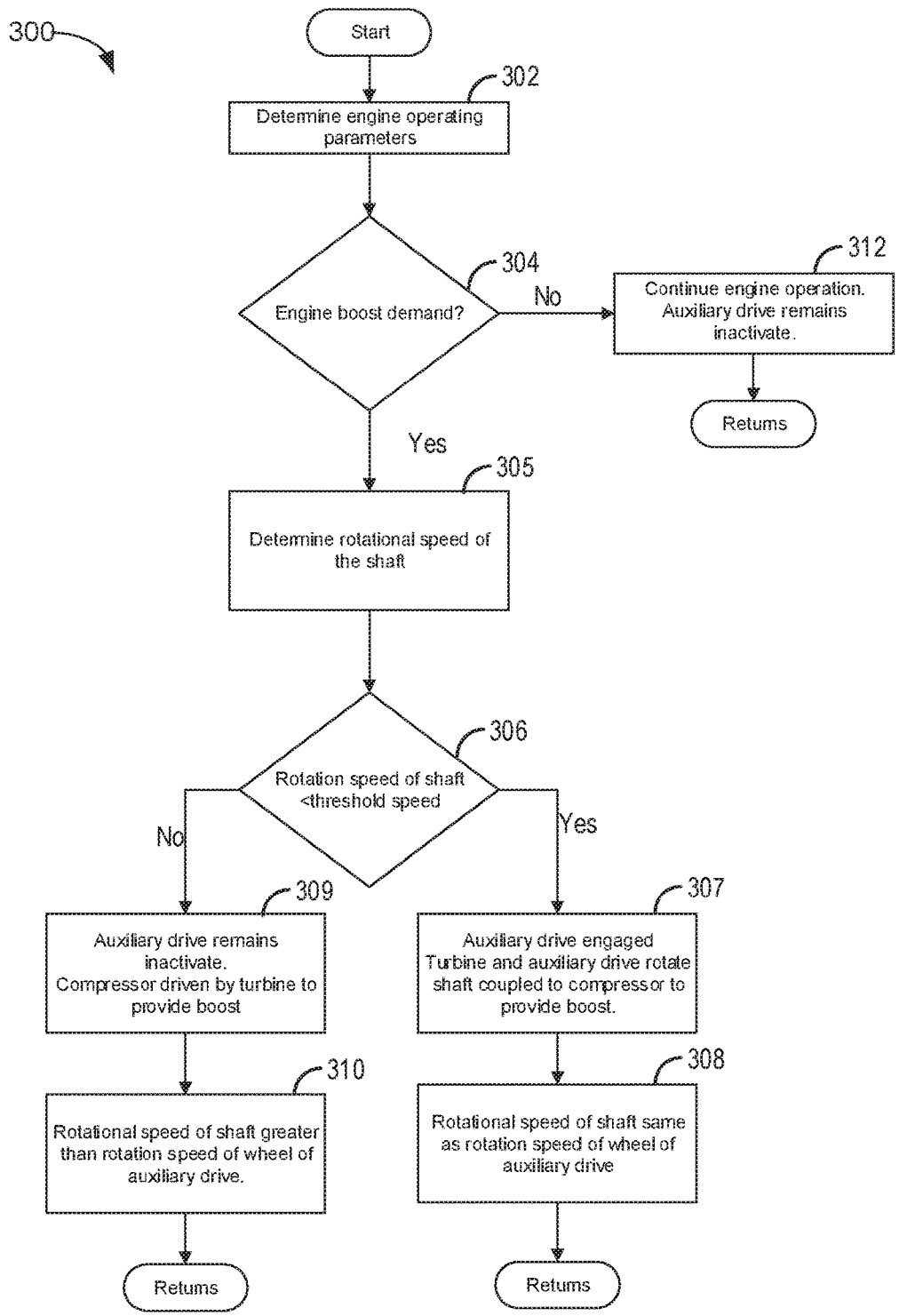
FIG. 3 illustrates a method for operating a supercharged internal combustion engine.

An embodiment of a spark ignited internal combustion engine is shown in FIG. 1. A compressor driven at least partially by a turbine and at least partially by an electric motor, supplying boost to an internal combustion engine, such as the spark ignited internal combustion engine of FIG. 1, is illustrated in FIGS. 2A-2B. A method for operation of a turbocharger coupled to an internal combustion engine to provide desired boost is illustrated in FIG. 3.

FIGS. 1, 2A, and 2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 may selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttles 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF (mass airflow) and MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses during revolution of the crankshaft 40. In some examples, storage medium read-only memory 106 may be programmed with computer readable data representing instructions executable by processor 102 for performing the methods described below with reference to FIG. 3, as well as other variants that are anticipated but not specifically listed.

Engine 10 may further include a compression device such as a turbocharger or supercharger including at least a compressor 60 arranged along intake manifold 44. For a turbocharger the compressor may be coupled to a turbine 62 via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine. The amount of compression provided to one or more cylinders of the engine via a turbocharger or supercharger may be varied by controller 12. In some cases, the compressor 60 may be at least partially driven via a motor 70. The motor 70 may be an electrically driven motor. In one example, a battery may supply electrical energy to the motor 70. In a further example, electrical energy generated by the turbine 62 may be stored in through an electrical converter in the battery to drive the motor 70. Further, a sensor 123 may be disposed in intake manifold 44 for providing a BOOST signal to controller 12.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

FIG. 2A schematically and in a fragment shows in a side view and partially in half section an exhaust gas turbocharger 200 for the charging of a first embodiment of the internal combustion engine. The exhaust gas turbocharger 200 may be coupled to the internal combustion engine, such as the engine 10 with cylinders 30 described above with reference to FIG. 1. The exhaust gas turbocharger 200 may be the turbocharger of FIG. 1 with the compressor 60 at least partially driven by the turbine 62.

In order to feed the charge air to cylinders, the charged internal combustion engine may include an intake system. The intake system may include an intake passage connecting to an intake manifold of the charged internal combustion engine, for example, the intake passage 42 coupled to the intake manifold 44 connecting to the engine 10 in FIG. 1. In order to discharge the exhaust gases from the cylinders, an exhaust gas discharge system may be provided. For the purpose of charging the cylinder, the exhaust gas turbocharger may include a turbine, such as the turbine 62 of FIG. 1, arranged in the exhaust gas discharge system. The turbine may include a turbine impeller (not shown) mounted on a rotatable shaft 204c, and the turbocharger includes a compressor having a compressor impeller 205 mounted on the rotatable shaft 204c, similar to the compressor 60 of FIG. 1, arranged in the intake system. The compressor may be a radial compressor and may be in a housing 204d of the exhaust gas turbocharger in which the compressor impeller 205 may be arranged.

The compressor may include an entry region 207. The entry region 207 may extend and may be formed coaxially with the shaft 204c of the exhaust gas turbocharger. The compressor may include an exit region 208 via which the compressed charge air may be discharged substantially radially.

In order to enhance the torque characteristic an electric auxiliary drive 209 may be present upstream of the compressor impeller 205 in the entry region 207 of the radial compressor and may be activated as requested.

The electric auxiliary drive 209 (which may be one non-limiting example of the motor 70 of FIG. 1) may include a stator 209a and a rotor 209b. The rotor 209b of the electric auxiliary drive 209 may include a wheel 210b, which may be arranged on the shaft 204c of the exhaust gas turbocharger. The wheel 210b may be mounted on the shaft 204c by means of an overrunning clutch 201. In example, an electromagnetic clutch may be used to couple the wheel to the shaft. The wheel 210b may be a spoked wheel 210b running freely in one direction of rotation when a rotational speed $n_{shaft}$ of the shaft 204c of the exhaust gas turbocharger is greater than a rotational speed $n_{wheel}$ of the spoked wheel 210b. The stator 209a may be secured in the housing 204d (e.g., the stator 209a may be fixed to the housing 204d), and circumferentially surrounds the rotor 209b.

The rotor 209b may include a plurality of permanent magnets 211, which may be arranged on radially outer edges of the spoked wheel 210b. When a coil 210a of the stator 209a is energized, an electromagnetic force rotating the rotor 209b may be generated.

FIG. 2B shows schematically and in a fragment, shows the charging illustrated in FIG. 2A in a side view rotated through 90°, perpendicularly to the supercharger shaft. Components previously introduced in FIG. 2A are numbered similarly and not reintroduced.

FIG. 2B illustrates that the spoked wheel 210b of the rotor 209b may be formed as a spoked wheel, with the plurality of permanent magnets 211 positioned radially on outer edges of the spoked wheel 210b.

FIG. 3 illustrates a method 300 for operating a supercharged internal combustion engine with a turbine and an auxiliary drive coupled to a shaft driving a compressor. The compressor may provide compressed intake air to the engine for meeting boost demands. In one example, the method 300 may be used to operate the supercharged internal combustion engine 10, compressor 60, turbine 62, and motor 70 of FIG. 1 and/or the turbocharger 200 of FIG. 2A. The method 300 may be used to deliver boost to the supercharged internal combustion engine by activating the electric auxiliary drive 209 coupled to the shaft 204c driving the compressor impeller 205 of FIGS. 2A and 2B.

Instructions for carrying out method 300 may be executed by a controller, for example, the controller 12 of FIG. 1, based on instructions stored on a memory of the controller and in conjunction with signals received from sensors of the engine system, such as the sensors described above with reference to FIG. 1 and FIGS. 2A-2B. The controller may employ engine actuators of the engine system, for example, to energize the coil to generate an electromagnetic field to engage the electric auxiliary drive 209 to the shaft 204c of the exhaust gas turbocharger of FIG. 2A, to adjust engine operation, according to the methods described below.

At 302, method 300 assesses engine operating parameters, including but not limited to engine speed, engine torque, engine exhaust volume, etc. At 304, method 300 determines if an engine boost demand is present. In one example, engine boost demand may be present when the desired engine torque is not being met and additional boost is requested to reach the desired torque, for example, during an acceleration event. In another example, engine boost demand may be present during nearly any condition where it is desired to operate with the engine with boost (e.g., intake pressure greater than barometric pressure). If a boost demand is present, the method 300 proceeds to 305, discussed below. If a boost demand is not present at 304, the method 300 proceeds to 312, where the engine continues to operate while the auxiliary drive remains inactive (for example, the coil 210a of FIG. 2A-2B is not energized). The method 300 then returns.

At 305, the method 300 determines a rotation speed of the shaft of the exhaust gas turbocharger. In one example, the rotational speed of the shaft may be measured by one or more sensors coupled to the shaft. In another example, engine speed may be used to estimate rotational speed of the shaft. In a further example, the volume of exhaust flowing to the turbine may be used to estimate the rotational speed of the shaft. In other examples, other engine parameters, such as engine temperature, may additionally be used to determine the speed of the shaft.

The method 300 proceeds to 306 to determine if the rotational speed of the shaft is below a threshold speed. If the rotation speed of the shaft is less the threshold speed, the method proceeds to 307. In one example, the rotational speed of the shaft is below the threshold speed during low engine speed-load conditions where exhaust mass flow through the turbine is relatively low. As such, when the rotational speed of the shaft is below the threshold speed, the torque generated at the turbine is not sufficient to drive the compressor to meet the driver demanded torque. During these conditions, the auxiliary drive may be operated to increase the rotational speed of the shaft above the threshold speed, improving time to torque. In this way, during low rotational speeds of the shaft, the auxiliary drive may be used to provide turbine assist. In one example, the threshold shaft speed may be a predetermined proportion of a maximum rated speed of the shaft, such as 10% of the maximum rated speed. In another example, the threshold shaft speed may be a speed that is predicted to deliver less boost than requested, and as such may be based on operating conditions such as requested boost, engine speed, etc.

At 307, the auxiliary drive may be engaged to the shaft. The auxiliary drive may be engaged to the shaft through the overrunning clutch. In one embodiment, an electromagnetic clutch may be used to engage the auxiliary drive to the shaft, where a controller may actuate the electromagnetic clutch to engage the wheel of the auxiliary drive to the shaft. The coil of the auxiliary drive may be energized by a controller, for example, the controller 12 of FIG. 1, resulting in generation of an electromagnetic field for rotating the wheel of the auxiliary drive engaged to the shaft. In an example, a battery may supply electrical energy to the auxiliary drive to drive the shaft. In a further example, electrical energy generated by the turbine may be stored in through an electrical converter in the battery to drive the auxiliary drive coupled to the shaft.

At 309, the engaged auxiliary drive may increase the rotational speed of the shaft, such that the rotation speed of the wheel of the auxiliary drive is equal to the rotation speed of the shaft, for example, the speed of spoked wheel 210*b* surrounding the shaft 209*b* may be equal to the speed of the shaft 209*b* of FIGS. 2A and 2B. The rotational speed of the shaft, driven by the auxiliary drive and the turbine may provide adequate boost through the compressor to the engine. In one example, the permanent magnets 211 of the wheel 210*b*, as illustrated in FIG. 2B may provide high magnetic efficiency while rotating the wheel of the auxiliary drive. The rotating wheel with the permanent magnets surrounding the shaft may allow a low inertia of the shaft compared to a fixed rotor mounted to the shaft. The method 300 then returns.

At 306, if the rotational speed of the shaft is not below the threshold speed, the method 300 proceeds to 309. In one example, the rotational speed of the shaft may not be below the threshold speed during high engine speed-load conditions where exhaust mass flow through the turbine is relatively high. As such, when the rotational speed of the shaft is above the threshold speed, the torque generated at the turbine is sufficient to drive the compressor to meet the driver demanded torque. During these conditions, the auxiliary drive may not be engaged to increase the rotational speed of the shaft above the threshold speed.

At 309, the turbine continues to rotate the shaft and the coupled compressor to provide boost to the engine while the auxiliary drive is not engaged to the shaft. At 310, the rotational speed of the shaft may be greater than the rotational speed of the unengaged wheel of the auxiliary drive, which may rotate freely. The overrunning clutch between the auxiliary drive and the shaft may be disengaged when the rotational speed of the shaft is greater than the wheel of the auxiliary drive. The method 300 then returns.

In this way, adequate boost may be provided to the internal combustion at low engine speed-load conditions by engaging the electric auxiliary drive in addition to the turbine to rotate the shaft coupled to the compressor. The compressor driven by the electric auxiliary drive may compress more air, which may be delivered to the engine to provide boost. Conversely, the electric auxiliary drive may be disengaged from the shaft at high engine speed-load conditions, where the exhaust volume may be adequate to drive the shaft through the turbine to provide the requested boost. Additionally, the engagement or disengagement of the electromagnetically driven rotor of the auxiliary drive from the shaft may allow a low inertia of the shaft compared to a fixed mounted rotor, thereby resulting in efficient operation of the compressor.

The technical effect of driving the compressor, at least partially, by the electric auxiliary drive with an efficient electromagnetically-driven rotor driving the compressor shaft is compression and delivery of more air to the engine to provide boost, even at low engine speeds, thereby ensuring a wider operational range of the compressor for delivering adequate charge air to the engine.

One example of a spark-ignited charged internal combustion engine, may include at least one cylinder, an intake system for feeding charge air to the at least one cylinder, an exhaust gas discharge system for discharging exhaust gas from the at least one cylinder, the at least one exhaust gas turbocharger with a housing, a turbine, the turbine with at least one turbine impeller mounted on a rotatable shaft, and a compressor, the compressor with at least one compressor impeller mounted on the rotatable shaft, and an electric auxiliary drive with a stator and a rotor, the rotor of the electric auxiliary drive including a wheel arranged and mounted on the rotatable shaft of the exhaust gas turbocharger, the wheel running freely in one direction of rotation when a rotational speed of the rotatable shaft of the exhaust gas turbocharger is greater than a rotational speed of the wheel. A first example of the system includes, wherein the at least one exhaust gas turbocharger includes the turbine arranged in the exhaust gas discharge system and the compressor arranged in the intake system. A second example of the system optionally includes the first example and further includes, wherein the at least one exhaust gas turbocharger includes a first exhaust gas turbocharger and a second exhaust gas turbocharger, the first exhaust gas turbocharger including a first turbine arranged in the exhaust gas discharge system and a first compressor arranged in the intake system, and the second exhaust gas turbocharger including a second turbine arranged in the exhaust gas discharge system and a second compressor arranged in the intake system. A third example of the system optionally includes one or more of the first and second examples, and further includes wherein the turbine of the at least one exhaust gas turbocharger does not have a bypass line. A fourth example of the system optionally includes one or more of the first through the third examples, and further includes wherein the turbine of the at least one exhaust gas turbocharger has a variable turbine geometry. A fifth example of the system optionally includes one or more of the first through the fourth examples, and further includes wherein the compressor coupled to the turbine of the at the least one exhaust gas turbocharger has a variable compressor geometry. A sixth example of the system optionally includes one or more of the first through the fifth examples, and further includes wherein an electrical storage battery is coupled to the electric auxiliary drive for storing electrical energy. A seventh example of the system optionally includes one or more of the first through the sixth examples, and further includes wherein wherein the compressor of the at least one exhaust gas turbocharger is a radial compressor, this radial compressor having an entry region that extends and is formed coaxially with the shaft of the exhaust gas turbocharger. An eighth example of the system optionally includes one or more of the first through the seventh examples, and further includes wherein the electric auxiliary drive is arranged in the entry region of the radial compressor. A ninth example of the system optionally includes one or more of the first through the eighth examples, and further includes wherein the stator is arranged at least partially in the housing and is mounted fixed to the housing. A tenth example of the system optionally includes one or more of the first through the ninth examples, and further includes wherein the stator includes an energizable coil for establishing a magnetic field. An eleventh example of the system optionally includes one or more of the first through the tenth examples, wherein the rotor includes at least one permanent magnet for establishing a magnetic field. A twelfth example of the system optionally includes one or more of the first through the eleventh examples, wherein the least one permanent magnet is arranged on a radially outer edge of the wheel of the rotor. A thirteenth example of the system optionally includes one or more of the first through the twelfth examples, and further includes wherein the wheel of the rotor is arranged and mounted on the shaft of the exhaust gas turbocharger as a spoked wheel. A fourteenth example of the system optionally includes one or more of the first through the thirteen examples, and further includes, a controller including instructions executable to engage the electric auxiliary drive to the shaft responsive to the shaft rotating below a threshold speed.

An example method comprising, flowing uncompressed intake air through a spoked wheel of a rotor of an auxiliary drive mounted on a shaft coupling a compressor and a turbine of an exhaust gas turbocharger, the rotor rotating freely when a rotation speed of the shaft is above a threshold speed, and the rotor engaged to the shaft when the rotation speed of the shaft is below the threshold speed, and compressing the intake air via the compressor. A first example of the method further comprising, further comprising energizing a coil of the auxiliary drive to generate an electromagnetic field responsive to the rotational speed of the shaft falling below the threshold. A second example of the method optionally includes the first example, and further includes activating the auxiliary drive through the controller including instructions executable to engage the auxiliary drive to the shaft responsive to a speed of the internal combustion engine falling below a predefinable engine speed. A third example of the method optionally includes the first through the second examples, and further comprising activating the electric auxiliary drive through the controller including instructions executable to engage the auxiliary drive to the shaft responsive to an exhaust gas volume of the internal combustion engine falling below a predefinable exhaust gas volume.

Another example method includes, responsive to a rotation speed of a shaft below a threshold, engaging an electric motor to the shaft to increase the rotation speed of the shaft to drive a compressor of an exhaust gas turbocharger, and responsive to the rotation speed of the shaft above the threshold, disengaging the electric motor from the shaft, the shaft rotated through a turbine of the exhaust gas turbocharger.

An example system includes, an electric auxiliary drive mounted on a rotatable shaft, the rotatable shaft coupled to a compressor and to a turbine, the compressor delivering boost through an intake system to an engine and the turbine receiving exhaust through an exhaust discharging system of the engine, the electric auxiliary drive including, a rotor including a wheel mounted on the rotatable shaft, the rotor coupled to the shaft through a clutch, at least one permanent magnet arranged on a radially outer edge of the wheel, and a coil configured to generate an electromagnetic field. The system also includes a controller storing instructions executable for energizing the coil to generate the electromagnetic field for rotating the rotor mounted on the rotatable shaft.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing may be varied to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A spark-ignited charged internal combustion engine, comprising:
   at least one cylinder;
   an intake system for feeding charge air to the at least one cylinder;
   an exhaust gas discharge system for discharging exhaust gas from the at least one cylinder;

at least one exhaust gas turbocharger comprising a housing, a turbine, and a compressor, the turbine having at least one turbine impeller mounted on a rotatable shaft, the compressor having at least one compressor impeller mounted on the rotatable shaft; and an electric auxiliary drive including a stator and a rotor, the rotor of the electric auxiliary drive including a spoked wheel, a radially inner circumference of the spoked wheel mounted on the rotatable shaft of the exhaust gas turbocharger, and at least one permanent magnet fixed to a radially outer circumference of the spoked wheel, the radially outer circumference of the spoked wheel spaced away from the stator, the spoked wheel running freely in one direction of rotation when a rotational speed of the rotatable shaft of the exhaust gas turbocharger is greater than a rotational speed of the spoked wheel.

2. The spark-ignited charged internal combustion engine of claim 1, wherein the at least one exhaust gas turbocharger includes the turbine arranged in the exhaust gas discharge system and the compressor arranged in the intake system.

3. The spark-ignited charged internal combustion engine of claim 1, wherein the at least one exhaust gas turbocharger includes a first exhaust gas turbocharger and a second exhaust gas turbocharger, the first exhaust gas turbocharger including a first turbine arranged in the exhaust gas discharge system and a first compressor arranged in the intake system, and the second exhaust gas turbocharger including a second turbine arranged in the exhaust gas discharge system and a second compressor arranged in the intake system.

4. The spark-ignited charged internal combustion engine of claim 1, wherein the turbine of the at least one exhaust gas turbocharger does not have a bypass line.

5. The spark-ignited charged internal combustion engine of claim 1, wherein the turbine of the at least one exhaust gas turbocharger has a variable turbine geometry.

6. The spark-ignited charged internal combustion engine of claim 1, wherein the compressor coupled to the turbine of the at the least one exhaust gas turbocharger has a variable compressor geometry.

7. The spark-ignited charged internal combustion engine of claim 1, wherein an electrical storage battery is coupled to the electric auxiliary drive for storing electrical energy.

8. The spark-ignited charged internal combustion engine of claim 1, wherein the compressor of the at least one exhaust gas turbocharger is a radial compressor, the radial compressor having an entry region that extends and is formed coaxially with the rotatable shaft of the exhaust gas turbocharger.

9. The spark-ignited charged internal combustion engine of claim 1, wherein the electric auxiliary drive is arranged in an entry region of a radial compressor.

10. The spark-ignited charged internal combustion engine of claim 1, wherein the stator is arranged at least partially in the housing and is mounted fixed to the housing.

11. The spark-ignited charged internal combustion engine of claim 1, wherein the stator includes an energizable coil for establishing a magnetic field.

12. The spark-ignited charged internal combustion engine of claim 1, further comprising a controller including instructions executable to activate the electric auxiliary drive to the rotatable shaft responsive to the rotatable shaft rotating below a threshold speed.

13. A method for operating an internal combustion engine, comprising:

flowing uncompressed intake air through a spoked wheel of a rotor of an auxiliary drive, where a radially inner circumference of the spoked wheel is mounted on a shaft coupling a compressor and a turbine of an exhaust gas turbocharger, the rotor rotating freely when a rotational speed of the shaft is above a threshold speed, and the rotor engaged to the shaft when the rotational speed of the shaft is below the threshold speed, and wherein a radially outer circumference of the spoked wheel is spaced away from a stator circumferentially surrounding the radially outer circumference of the spoked wheel, and wherein at least one permanent magnet is fixed to the radially outer circumference of the spoked wheel; and compressing the intake air via the compressor.

14. The method as claimed in claim 13, further comprising energizing a coil of the auxiliary drive to generate an electromagnetic field responsive to the rotational speed of the shaft falling below the threshold speed.

15. The method as claimed in claim 14, wherein engaging the rotor to the shaft comprises activating the auxiliary drive responsive to a speed of the internal combustion engine falling below a predefinable engine speed.

16. The method as claimed in claim 14, wherein engaging the rotor to the shaft comprises activating the auxiliary drive responsive to an exhaust gas volume of the internal combustion engine falling below a predefinable exhaust gas volume.

17. An engine system, comprising:

an electric auxiliary drive mounted on a rotatable shaft, the rotatable shaft coupled to a compressor and to a turbine, the compressor delivering boost through an intake system to an engine and the turbine receiving exhaust through an exhaust discharging system of the engine, the electric auxiliary drive including:

a rotor including a spoked wheel mounted on the rotatable shaft, a radially inner edge of the spoked wheel of the rotor coupled to the rotatable shaft through a clutch;

at least one permanent magnet arranged on a radially outer edge of the spoked wheel; and a stator, where the stator is a coil configured to generate an electromagnetic field, the coil surrounding the radially outer edge of the spoked wheel and spaced away from the radially outer edge of the spoked wheel; and a controller storing instructions executable for energizing the coil to generate the electromagnetic field for rotating the rotor mounted on the rotatable shaft.

18. The engine system of claim 17, wherein the coil is energized to generate the electromagnetic field responsive to the rotatable shaft rotating below a threshold speed.

19. The engine system of claim 18, wherein the clutch is further activated to couple the rotor to the rotatable shaft responsive to the rotatable shaft rotating below the threshold speed.

20. The engine system of claim 17, wherein the controller further comprises instructions for disengaging the clutch coupling the spoked wheel of the rotor to the rotatable shaft responsive to a rotational speed of the rotatable shaft being greater than a rotational speed of the spoked wheel of the rotor.

* * * * *